United States Patent
Dunnihoo et al.

(10) Patent No.: US 8,254,071 B2
(45) Date of Patent: Aug. 28, 2012

(54) METHOD AND APPARATUS OF PROVIDING 2-STAGE ESD PROTECTION FOR HIGH-SPEED INTERFACES

(75) Inventors: Jeff Dunnihoo, Bertram, TX (US); Richard Kimoto, Fremont, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 281 days.

(21) Appl. No.: 12/180,440

(22) Filed: Jul. 25, 2008

(65) Prior Publication Data

US 2009/0046401 A1    Feb. 19, 2009

Related U.S. Application Data

(60) Provisional application No. 60/955,797, filed on Aug. 14, 2007.

(51) Int. Cl.
*H02H 9/00* (2006.01)
*H02H 7/12* (2006.01)
*H02H 1/00* (2006.01)
*H02H 1/04* (2006.01)
*H02H 3/22* (2006.01)
*H02H 9/06* (2006.01)

(52) U.S. Cl. ......... 361/56; 361/118
(58) Field of Classification Search .......... 361/56
See application file for complete search history.

(56) References Cited

U.S. PATENT DOCUMENTS

| 6,456,472 B1 * | 9/2002 | Beriault | 361/56 |
| 6,624,999 B1 * | 9/2003 | Johnson | 361/113 |
| 7,072,161 B2 * | 7/2006 | Chen | 361/91.1 |
| 7,649,726 B2 * | 1/2010 | Castro | 361/119 |

* cited by examiner

*Primary Examiner* — Dharti Patel
(74) *Attorney, Agent, or Firm* — Pillsbury Winthrop Shaw Pittman LLP

(57) ABSTRACT

The present invention relates to a method and apparatus of providing 2-stage ESD protection for high-speed interfaces. An aspect of the present invention is to provide an integrated multi-stage ESD/EOS protection solution for such high-speed applications. In one embodiment, the ESD protection device has multiple ESD stages integrated into a single integrated circuit package and is mounted to a printed circuit board in series with a device under protection. In another embodiment the multiple ESD stages integrated into a single integrated circuit package of the ESD protection device are coupled with a series element that isolates a 2nd stage from a 1st stage during an ESD event, thus ensuring that the $2^{nd}$ stage turns on before the $1^{st}$ stage, as well as provides for less current in the $2^{nd}$ stage.

20 Claims, 5 Drawing Sheets

METHOD AND APPARATUS OF PROVIDING 2-STAGE ESD PROTECTION FOR HIGH-SPEED INTERFACES

CLAIM OF PRIORITY

This application claims benefit to U.S. Provisional Appl. No. 60/955,797 filed on Aug. 14, 2007 entitled "2-Stage ESD Protection For USB Applications," which application is expressly incorporated by reference herein

FIELD OF THE INVENTION

The present invention relates to a method and apparatus of providing 2-stage ESD protection for high-speed interfaces.

BACKGROUND OF THE INVENTION

Various companies currently have electronic systems with multiple high-speed I/O interfaces development. These systems and interfaces must meet various industry standard signal integrity specifications and also ESD (electrostatic discharge)/EOS (electrical overstress) survivability ratings. The target ratings for these different systems can vary, but an example of one target ESD rating for typical USB 2.0 interfaces is 8 kV contact, Level 4 IEC 61000-4-2.

In many conventional systems, there exists both a Device Under Protection (DUP), such as a high-speed I/O interface device to be protected, as well as a Device Under Test (DUT, the "shield" device).

As illustrated in FIG. 1, in a conventional system 100 having a DUP 110 and a DUT 120, the chip bondwire and other parasitic inductance 130 presents a high impedance at high frequencies and fast pulse edge rates (i.e. during an ESD event). The amount of current drawn away from the DUP 110 is hindered by the bondwire and these parasitic elements. As a result, the DUP 110 is still largely directly exposed to the ESD threat, as illustrated in FIG. 1.

Further, as shown in FIG. 2, existing "shunt-architecture" ESD Products have the DUT 120 in parallel with DUP 110. In these existing devices, series parasitic resistance and inductance of the DUT 110 work against drawing ESD current away from the DUP 110.

There also exist conventional structures with multiple stages similar that are designed as filters designed to block spurious high frequencies from desired lower frequencies. While such conventional filter structures perform this blocking well, they are not optimized for ESD protection and high speed signal integrity.

SUMMARY OF THE INVENTION

The present invention relates to a method and apparatus of providing 2-stage ESD protection for high-speed interfaces.

An aspect of the present invention is to provide an integrated multi-stage ESD/EOS protection solution for such high-speed applications.

In one embodiment, the ESD protection device has multiple ESD stages integrated into a single integrated circuit package and is mounted to a printed circuit board in series with a device under protection.

In another embodiment the multiple ESD stages integrated into a single integrated circuit package of the ESD protection device are coupled with a series element that isolates a 2nd stage from a 1st stage during an ESD event, thus ensuring that the $2^{nd}$ stage turns on before the $1^{st}$ stage, as well as provides for less current in the $2^{nd}$ stage.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

Figure 1:
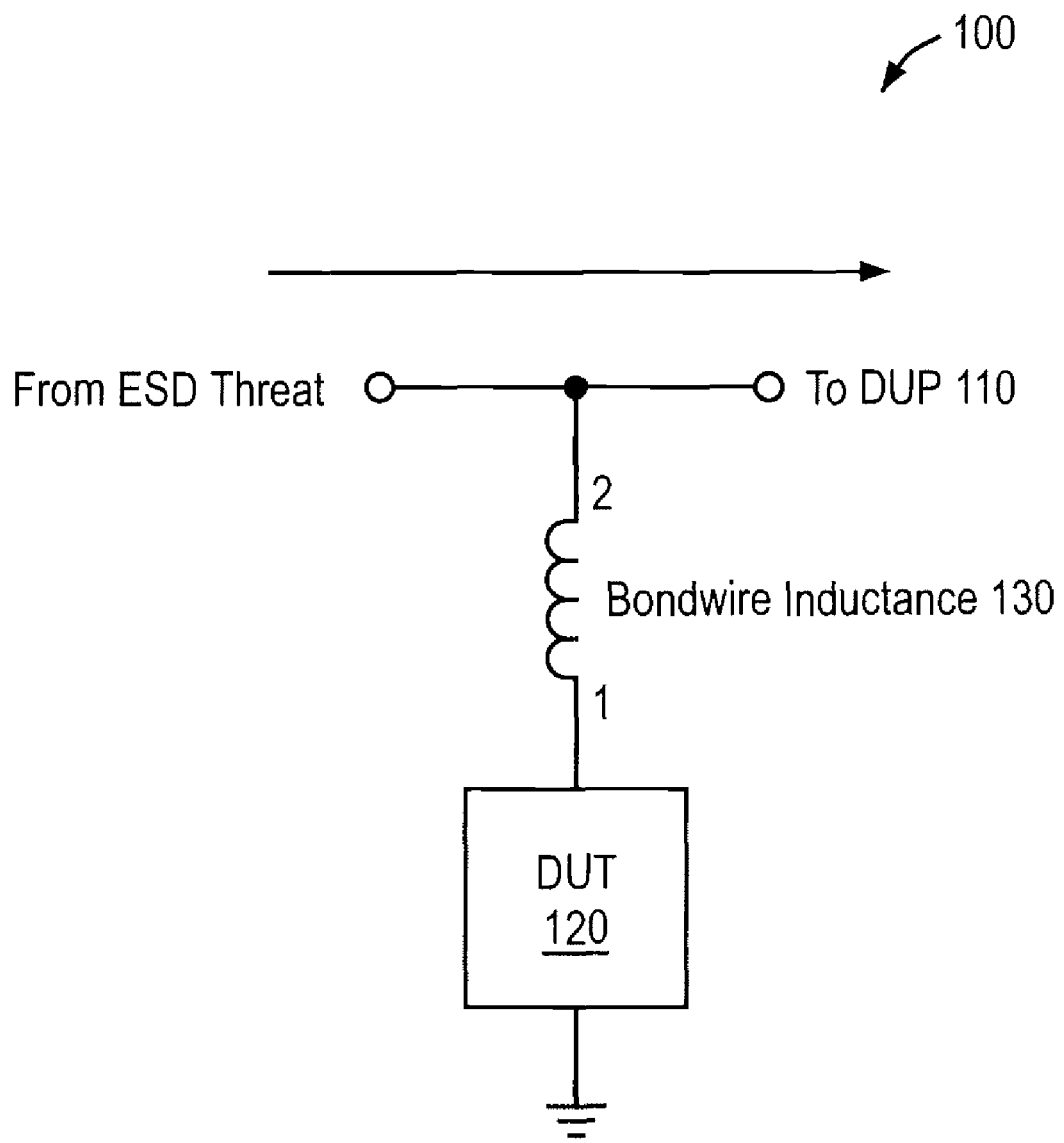
FIG. 1 illustrates a conventional ESD system.
Figure 2:
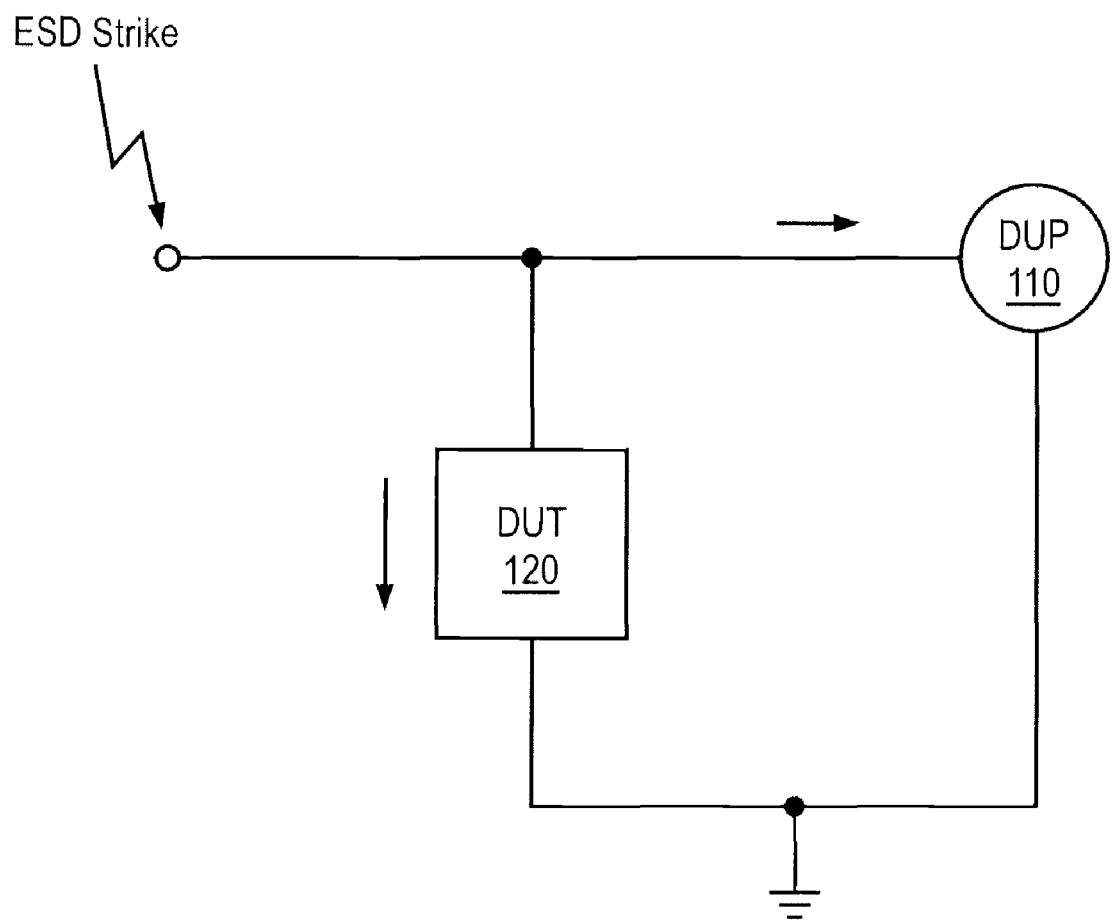
FIG. 2 illustrates a conventional series implementation of a device tinder protection and a device under test.
Figure 3:
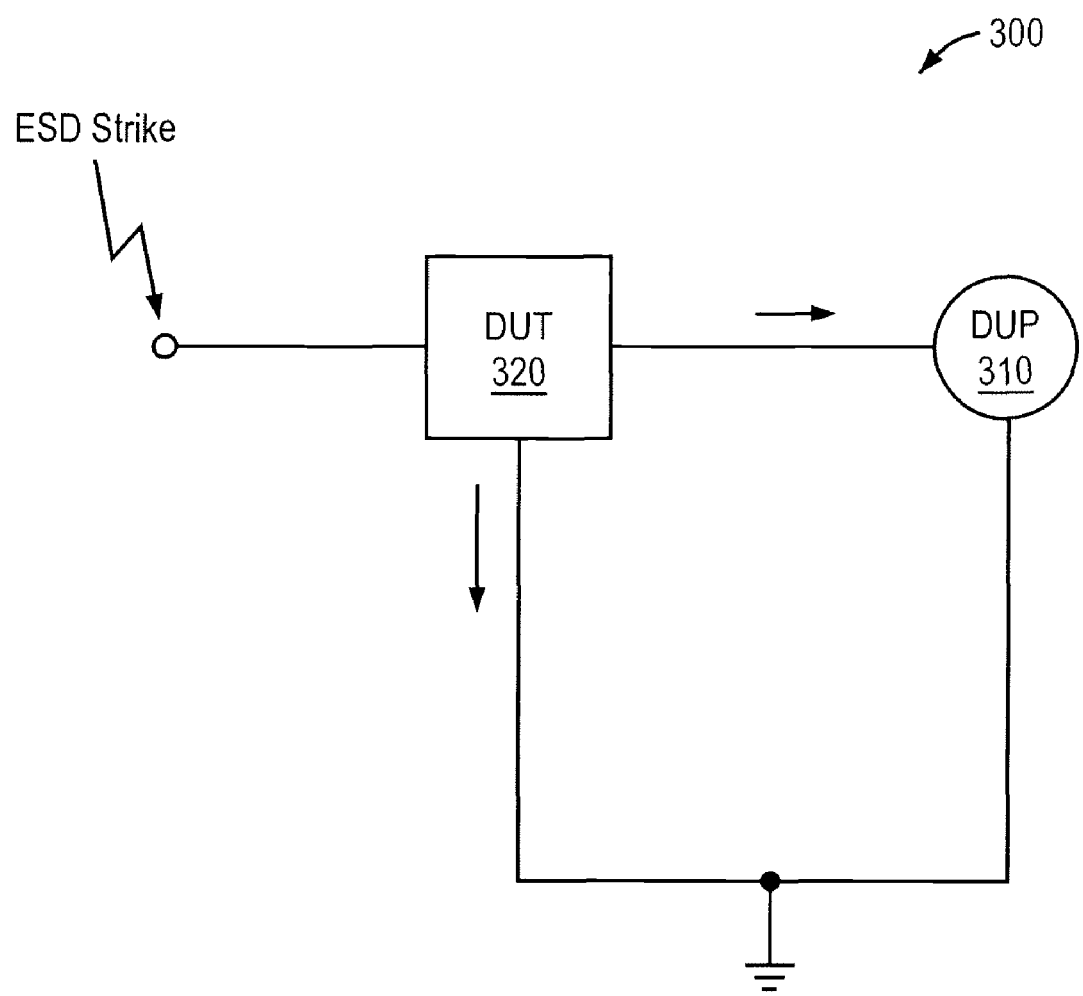
FIG. 3 illustrates an ESD system according to the present invention.

The present invention is implemented in an overall system 300 in which there is a DUP 310 and a DUT 320, as shown in FIG. 3, in which the DUT 320 is in series with the DUP 310. As a result, the ESD Event must pass through DUT 320 before getting to the DUP 320. Further, parasitic series inductance and resistance work with DUT 320 to reduce current into DUP 310.

Figure 4:
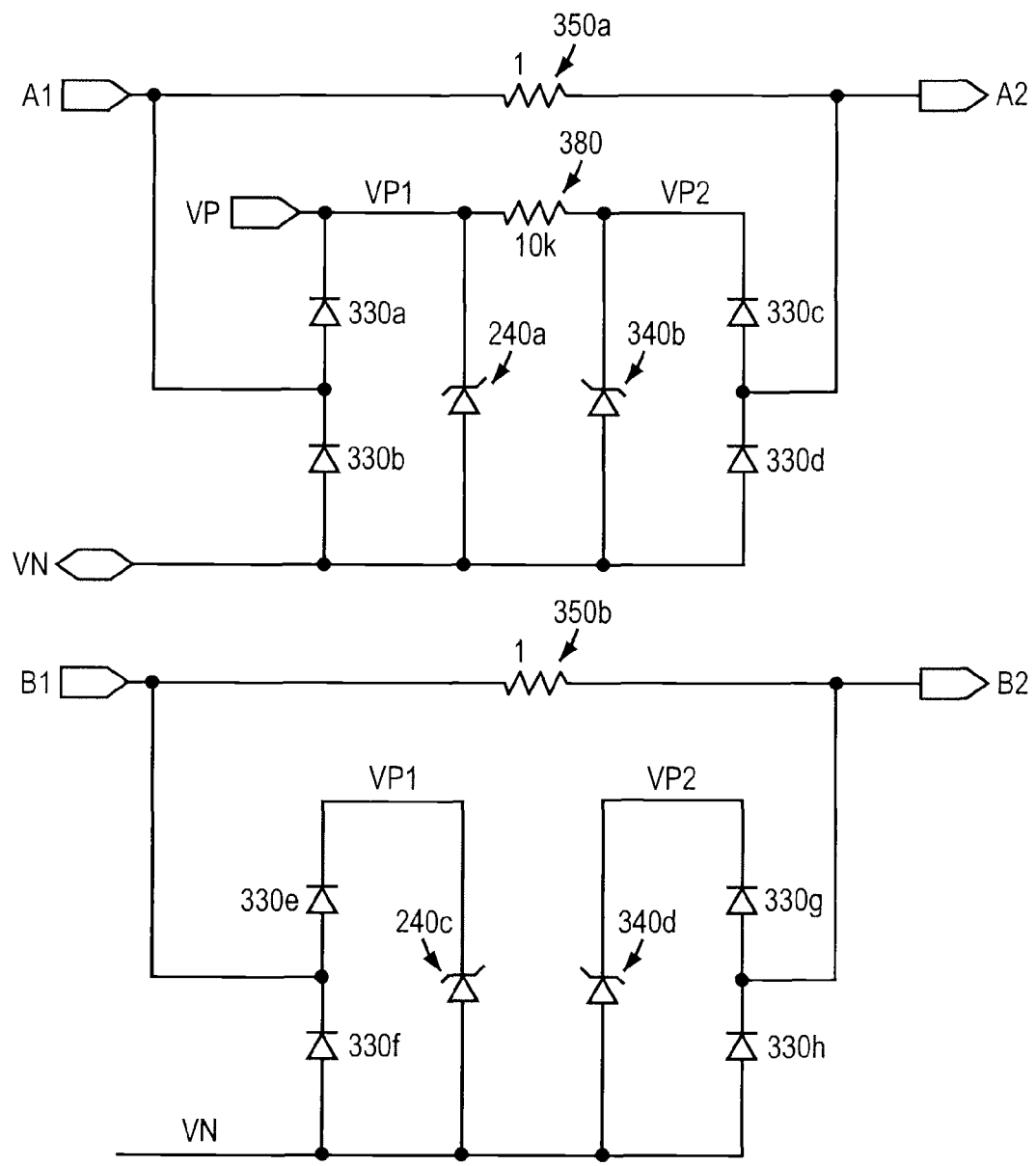
FIG. 4 illustrates a differential device under test according to the present invention.

A simplified example of a DUT circuit 320 that implements this solution is shown in FIG. 4, using node name bus notation, and in one implementation is provided within a 6-lead SOT23-6 package. With this circuit notation, which shows a differential pair (dual channel) implementation, it should be noted that VP1-VP1 are the same node and VP2-VP2 are also identical and connected. It is also noted that the diode/zener configuration can be constructed with four channels of a CMD PicoGuard CM1213.

The resistive elements 350a-b, which are shown in the preferred embodiment as a 1 ohm resistor, are each the series element between input and the output, and the series element 380, shown in the preferred embodiment as a 10 k resistor, allows the zener diodes to be biased to the same voltage with a single external pin, and also ensures that the first stage of the ESD circuit that includes steering diodes 330a-b and 330e-f and zener diodes 340a, 340c turn on before the second stage of the ESD circuit that includes steering diodes 330c-d and 330g-h and zener diodes 340b, 340d. The resistive elements 350a-b, however, could also each be an inductor, transformer, common mode filter, or even a capacitor+inductor combination for an AC coupled band-pass filter.

An implementation with the series element 380 can be used to reduce the amount of external pins needed to bias the zener diodes 340 for each stage. Biasing helps reduce capacitance for better signal integrity. If there are two stages, it is preferable to have two separate pins for each VP rail to bias both stages. In this implementation, the series element 380 biases the 2nd stage up while isolating the 2nd stage from 1st stage during an ESD event, thus ensuring that the $2^{nd}$ stage turns on before the $1^{st}$ stage, as noted above, as well as provides for less current in the $2^{nd}$ stage.

Also, while FIG. 4 illustrates the usage of four zener diodes 340a-d, other numbers of zener diodes may be used, such as two zener diodes (one on the A_IN/B_IN and one on the A_OUT/B_OUT). An alternative embodiment may not use any zener diodes as these are implementation options in each stage, related to clamping performance improvements for positive ESD strikes relative to ground, and can be implemented in numerous ways, including internal or external bypass capacitors, clamps, or other dynamic current return path.

Figure 5:
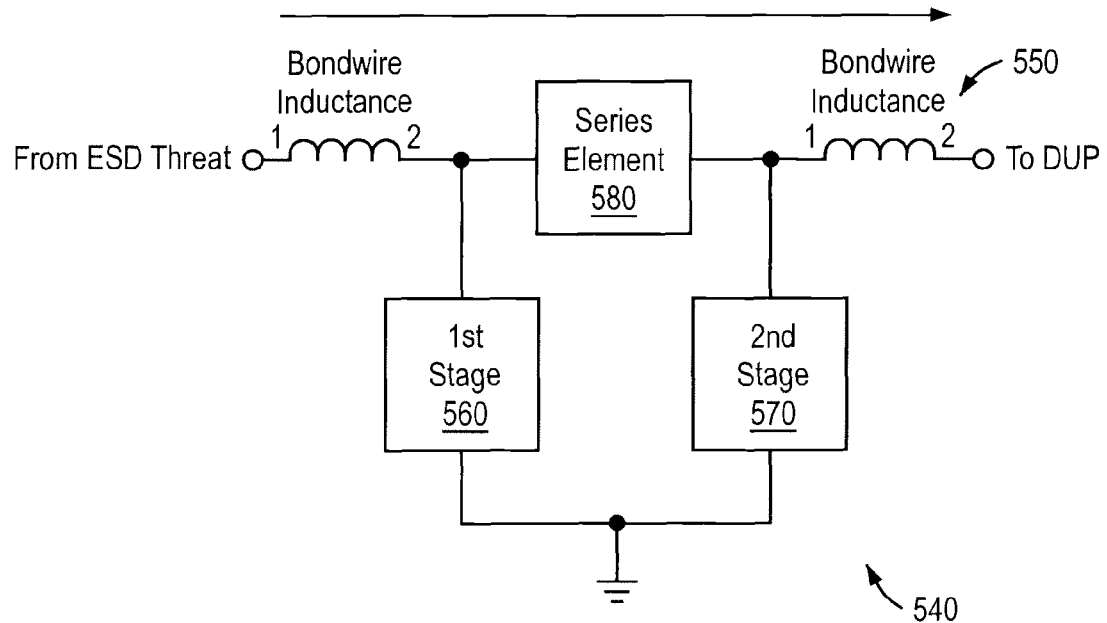
FIG. 5 illustrates an overview of a device under test having multiple ESD stages integrated into a single integrated circuit package and mounted to a printed circuit board according to the present invention.

In general, the DUT according to the present invention, illustrated in one differential pair implementation in FIG. 4, can more generally be described as having one or more internal stages (560 and 570 shown in FIG. 4) each separated by a series element 580. FIG. 5 illustrates an overview of such a DUT having multiple ESD stages 560, 570 and 580 integrated into a single integrated circuit package and mounted to a printed circuit board 540 according to the present invention. The series element 580 can be an inductance and/or resistance, and each stage is composed of an ESD structure which normally has a significant capacitance associated, as shown in FIG. 5.

By integrating the stages 560, 570 and 580 shown in FIG. 5 into a single package that can then be mounted onto a printed circuit board 540, which circuit board has associated bondwire inductance 550 associated with it, a number of improvements are gained over a similar solution made from discrete components. A first advantage is that the differences due to process and other variations between one channel to another can be tightly matched. This minimizes the negative effects that mismatch presents on solutions where signal integrity is important. For example, the two channels with minimized mismatch may make up a differential pair. The lower mismatch will reduce signal skew and reflections presented by the DUT. A second advantage is that by integrating the stages into a single package, the mismatch is again reduced and results in the same positive effects mentioned above. A third advantage is that board space and thus cost can be reduced as compared to a discrete solution.

Figure 6:
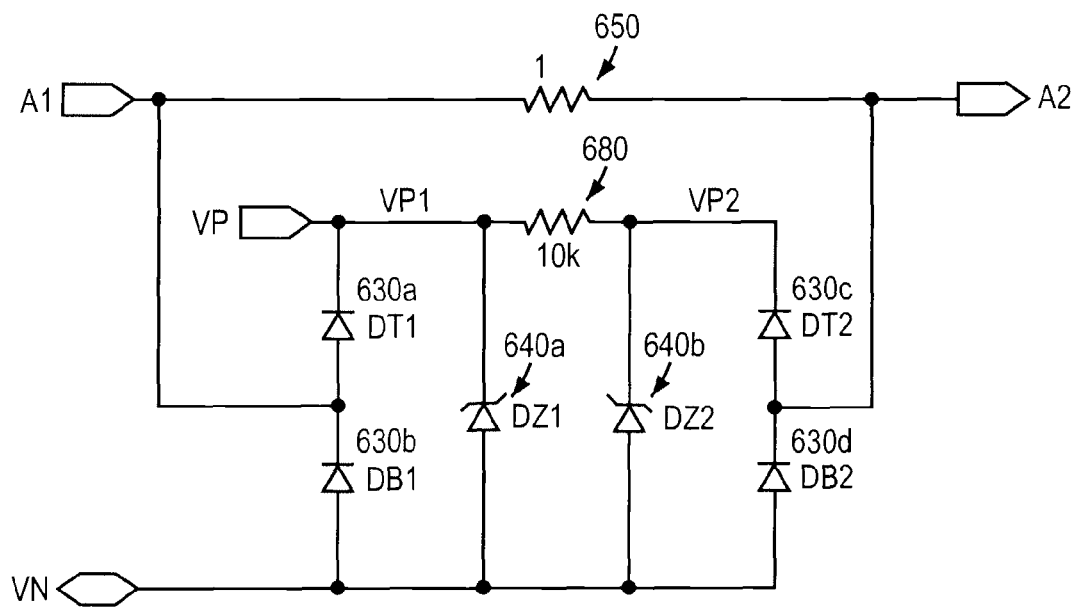
FIG. 6 illustrates a single ended device under test according to the present invention.

In a single channel implementation as shown in FIG. 6, each ESD stage has a pair of steering diodes 630a-b and 630c-d, respectively, and a zener diode, 630a and 630b, respectively. Stage 1 includes steering diodes 630a-b and a zener diode, 630a. Stage 2 includes steering 630c-d and zener diode 630b. The resistive element 650, shown in the preferred embodiment as a 1 ohm resistor, is the series element between input and output, and the series resistance 680, shown in the preferred embodiment as a 10 k resistor, allows the zener diodes 630a-b to be biased to the same voltage with a single external pin. The resistive element 650, however, could also be an inductor, transformer, common mode filter, or even a capacitor+inductor combination for an AC coupled bandpass filter.

An implementation with the series element 680 can be used to reduce the amount of external pins needed to bias the zener diodes for each stage. Biasing helps reduce capacitance for better signal integrity. If there are two stages, it is preferable to have two separate pins for each VP rail to bias both stages. In this implementation, the series element 680 biases the 2nd stage up while isolating the 2nd stage from 1st stage during an ESD event, thus ensuring that the $2^{nd}$ stage turns on before the $1^{st}$ stage, as noted above, as well as provides for less current in the $2^{nd}$ stage.

Aspects of the present invention include the usage of series elements, flow-through routing and distributed ESD stages.

With respect to series elements, inductance presents high impedance at high frequencies and fast pulse edge rates (ESD event), limiting current and voltage to the DUP, and the resistance drops or attenuates a high voltage at high current, reducing the voltage observed at the DUP. At low signal currents during normal operation, the resistance creates some signal attenuation in the pass-band, reducing available signal, but at acceptable levels within the interface devices recovering sensitivity or transmit level requirements such that the overall system still meets signal integrity requirements.

With respect to flow-through routing, packaging bondwires don't hinder ESD protection, they help. Specifically, packaging bondwires can be used to tune the transmission line's impedance (i.e. cancel effect of ESD stage capacitance), which improves signal integrity by making the DUT more transparent Distributed ESD Stages (multiple stages).

With respect to distributes capacitance across multiples stages, this allows capacitance to-be offset by series inductance (i.e. Lumped element transmission line, LCLCL . . . ), which makes the DUT transparent to the system. Also, in conjunction with the series element, the distributed stages are more effective in drawing ESD event away from the DUP.

Although the present invention has been particularly described with reference to embodiments thereof, it should be readily apparent to those of ordinary skill in the art that various changes, modifications and substitutes are intended within the form and details thereof, without departing from the spirit and scope of the invention. For example, in certain applications the DUP may have included on the integrated circuit associated with it the second stage of the DUT as has been described above. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. An electrostatic discharge (ESD) protection device that protects another separate protected device from an ESD event pulse by transmitting the ESD event pulse to ground and that passes a signal to the separate protected device, the ESD protection device comprising:

an integrated semiconductor provided in a first package adapted to be mounted on a printed circuit board, the integrated semiconductor including:

an input pad that receives the signal and the ESD event pulse;

an output pad adapted to pass the signal from the integrated semiconductor to a device under protection provided in a second package different from the first package; and an electrostatic discharge circuit connected between the input pad and the output pad, wherein the electrostatic discharge circuit passes the signal to the output pad and dissipates the ESD event pulse by providing a path to the ground for the ESD event pulse, the electrostatic discharge circuit comprising:

a first stage that contains a first ESD clamp device that provides an electrostatic discharge path to the ground for the ESD event pulse;

a second stage that contains a second ESD clamp device that provides another electrostatic discharge path to the ground for the ESD event pulse, such that the first stage clamps more energy from the ESD event pulse than the second stage; and a series coupling element that couples the first stage to the second stage, so that during the ESD event, the first stage turns on independently of the second stage wherein the separate protected device is mounted on the printed circuit board and the integrated semiconductor is adapted to be mounted on the printed circuit board such that the integrated semiconductor is disposed in series with the separate protected device, and wherein a transmission line impedance of the integrated semiconductor is tuned using bond wires of the first package.

2. The apparatus according to claim 1 wherein the first ESD clamp device includes a first pair of steering diodes and a first zener diode and wherein the second ESD clamp device includes a second pair of steering diodes and a second zener diode.

3. The apparatus according to claim 2 wherein the signal is a differential signal having a positive component and a negative component, where the input pad, the output pad, and the electrostatic discharge circuit are duplicated within the first package to operate upon the differential signal; and further including dual rail clamps that are used by each of the first and second ESD clamp devices, wherein the dual rails include decoupled positive voltage rails.

4. The apparatus according to claim 3 wherein the duplicated electrostatic discharge circuits each include a separate first stage, second stage and series coupling element for each of the positive component and the negative component of the differential signal.

5. The apparatus according to claim 4 wherein the first ESD clamp device in each of the duplicated electrostatic discharge circuits include the first pair of steering diodes and the first zener diode and wherein the second ESD clamp in each of the duplicated electrostatic discharge circuits device includes the second pair of steering diodes and the second zener diode.

6. The apparatus according to claim 3 wherein the first and second ESD clamps each do not include a zener diode.

7. The apparatus according to claim 3 wherein the first stage turns on before the second stage.

8. The apparatus according to claim 1 wherein the first and second ESD clamps each do not include a zener diode.

9. The apparatus according to claim 1 wherein the first stage turns on before the second stage.

10. An apparatus for transmitting a signal and discharging an ESD event pulse associated with an ESD event to ground comprising:

a printed circuit board having an input line that transmits the signal;

a device under protection mounted on the printed circuit board, the device under protection comprising an integrated circuit that contains an ESD protected input that receives the signal and a device under protection electrostatic discharge circuit for dissipating the ESD event pulse by providing path to the ground, the device under protection electrostatic discharge circuit including a second stage that contains a second ESD clamp device; and an electrostatic discharge protection device provided in a package that is mounted on the printed circuit board separately from the device under protection and between the input line and the device under protection, thereby protecting the device under protection from the ESD event and transmitting the signal to the device under protection, the electrostatic discharge protection device including:

an integrated semiconductor, the integrated semiconductor including:

an input pad electrically coupled to the input line of the printed circuit board, that receives the signal and the ESD event pulse associated with the ESD event;

an output pad electrically coupled to the ESD protected input of the device under protection so that the electrostatic discharge protection device is disposed in series with the device under protection and providing a path for the signal to the ESD protected input; and an electrostatic discharge circuit connected between the input pad and the output pad, the electrostatic discharge circuit dissipating the ESD event pulse by providing a path to the ground, the electrostatic discharge circuit comprising:

a first stage that contains a first ESD clamp device that provides an electrostatic discharge path to the ground, such that the first stage clamps more energy from the ESD event pulse than the second stage; and a series coupling element that couples the first stage to the second stage, so that during the ESD event, the first stage turns on independently of the second stage, wherein bond wires of the package are used to tune a transmission line impedance of the integrated semiconductor.

11. The apparatus according to claim 10 wherein the first ESD clamp device includes a first pair of steering diodes and a first zener diode and wherein the second ESD clamp device includes a second pair of steering diodes and a second zener diode.

12. The apparatus according to claim 11 wherein the signal is a differential signal having a positive component and a negative component, where the input pad, the output pad, the device under protection electrostatic discharge circuit, and the electrostatic discharge circuit are duplicated to operate upon the differential signal; and further including dual rail clamps that are used by each of the first and second ESD clamp devices, wherein the dual rails include decoupled positive voltage rails.

13. The apparatus according to claim 12 wherein the duplicated electrostatic discharge circuits each include a separate first stage, second stage and series coupling element for each of the positive component and the negative component of the differential signal.

14. The apparatus according to claim 13 wherein the first ESD clamp device in each of the duplicated electrostatic discharge circuits include the first pair of steering diodes and the first zener diode and wherein the second ESD clamp in each of the duplicated electrostatic discharge circuits device includes the second pair of steering diodes and the second zener diode.

15. The apparatus according to claim 12 wherein the first and second ESD clamps each do not include a zener diode.

16. The apparatus according to claim 12 wherein the first stage turns on before the second stage.

17. The apparatus according to claim 10 wherein the first and second ESD clamps each do not include a zener diode.

18. The apparatus according to claim 10 wherein the first stage turns on before the second stage.

19. An electrostatic discharge ("ESD") circuit that transmits a differential signal and discharges an ESD event pulse to ground, the ESD circuit comprising an integrated semiconductor provided within an integrated circuit package that is adapted to be mounted on a printed circuit board in series with a protected device that is also mounted on the printed circuit board, wherein the integrated semiconductor includes:

a pair of input pads that receives the differential signal;

a two channel electrostatic discharge circuit that conducts the differential signal to output pads, and that is configured to dissipate the ESD event pulse by providing paths to the ground, wherein the differential signal is transmitted to the protected device through the electrostatic discharge circuits, the output pads and the printed circuit board, and wherein each channel of the electrostatic discharge circuit comprises:

a first stage that contains a first ESD clamp device that provides an electrostatic discharge path to the ground for the ESD event pulse;

a second stage that contains a second ESD clamp device that provides another electrostatic discharge path to the ground for the ESD event pulse, such that the first stage clamps more energy from the ESD event pulse than the second stage; and a series coupling element that couples the first stage to the second stage, so that during the ESD event, the first stage turns on independently of the second stage, wherein bonding wires in the integrated circuit package are used to tune impedances of the integrated semiconductor, the tuned impedances including a transmission line impedance.

20. The electrostatic discharge circuit of claim 19, wherein inductances associated with the bonding wires in the integrated circuit package are tightly matched between the two channels of the electrostatic discharge circuit.

* * * * *